INVENTORS
HERMAN LUKOFF
J. R. STOVALL

BY William Hobrow
AGENT

Feb. 14, 1961　　H. LUKOFF ET AL　　2,972,127
ERROR RESPONSIVE SYSTEM
Filed Dec. 27, 1954　　　　　　　　　　　　3 Sheets-Sheet 3

INVENTORS
HERMAN LUKOFF
J.R. STOVALL
BY
AGENT

United States Patent Office 2,972,127
Patented Feb. 14, 1961

2,972,127
ERROR RESPONSIVE SYSTEM

Herman Lukoff, Philadelphia, and John R. Stovall, Jr., Mount Airy, Pa., assignors, by mesne assignments, to Sperry Rand Corporation, New York, N.Y., a corporation of Delaware Filed Dec. 27, 1954, Ser. No. 477,906
20 Claims. (Cl. 340—172.5)

This invention relates to error responsive systems and more particularly to systems for the re-inspection of information representing signals to correctly determine the existence of errors therein.

Prior art information handling systems have been provided with apparatus for detecting errors in the information signals being handled; the type of system and the form of the information signals determining, at least in part, the type of error detecting apparatus used. The detection of an error by such apparatus invariably halts the operation of the entire system until the operator can locate and correct the error manually.

Error detectors do not differentiate among the various types of errors which can occur and many detected errors may be transient in nature and of no real consequence to the proper operation of the system. In system utilizing information in coded impulse form, the momentary appearance of a noise pulse in the signals being inspected by the error detector causes the detector to indicate an error. This would also happen if an information pulse was slightly below the response threshold of the detector or if the detector were to momentarily cease functioning and so miss an information pulse. Other transient conditions may also cause the error detector to indicate errors when, in fact, no errors exist. Since the indication of an error is usually accompanied by the cessation of operation of the system and the subsequent location and correction of the indicated error by the operator, valuable time of both the system and of the operating personnel is wasted by the incorrect indication of errors.

It is, therefore, an object of this invention to provide new and improved signal responsive apparatus.

Another object of this invention is to provide new and improved signal responsive apparatus for determining the true existence of errors in information signals.

It is a further object of this invention to provide new and improved apparatus for governing extant signal responsive apparatus.

A still further object of this invention is to provide new and improved apparatus to recirculate electrical impulse signals representative of information for their repeated error inspection.

Another object of this invention is to provide new and improved apparatus to automatically recirculate electrical impulse signals representative of information for their repeated error inspection.

Yet another object of this invention is to provide new and improved apparatus for the repetitive reading of information representing signals to determine the presence or absence of errors therein.

Yet a further object of this invention is to provide new and improved apparatus for the automatic reading of information representing signals to determine the presence or absence of errors therein.

Other objects and advantages of this invention will in part be described and in part be obvious as the following specification is read in conjunction with the accompanying drawings in which.

Figure 1:
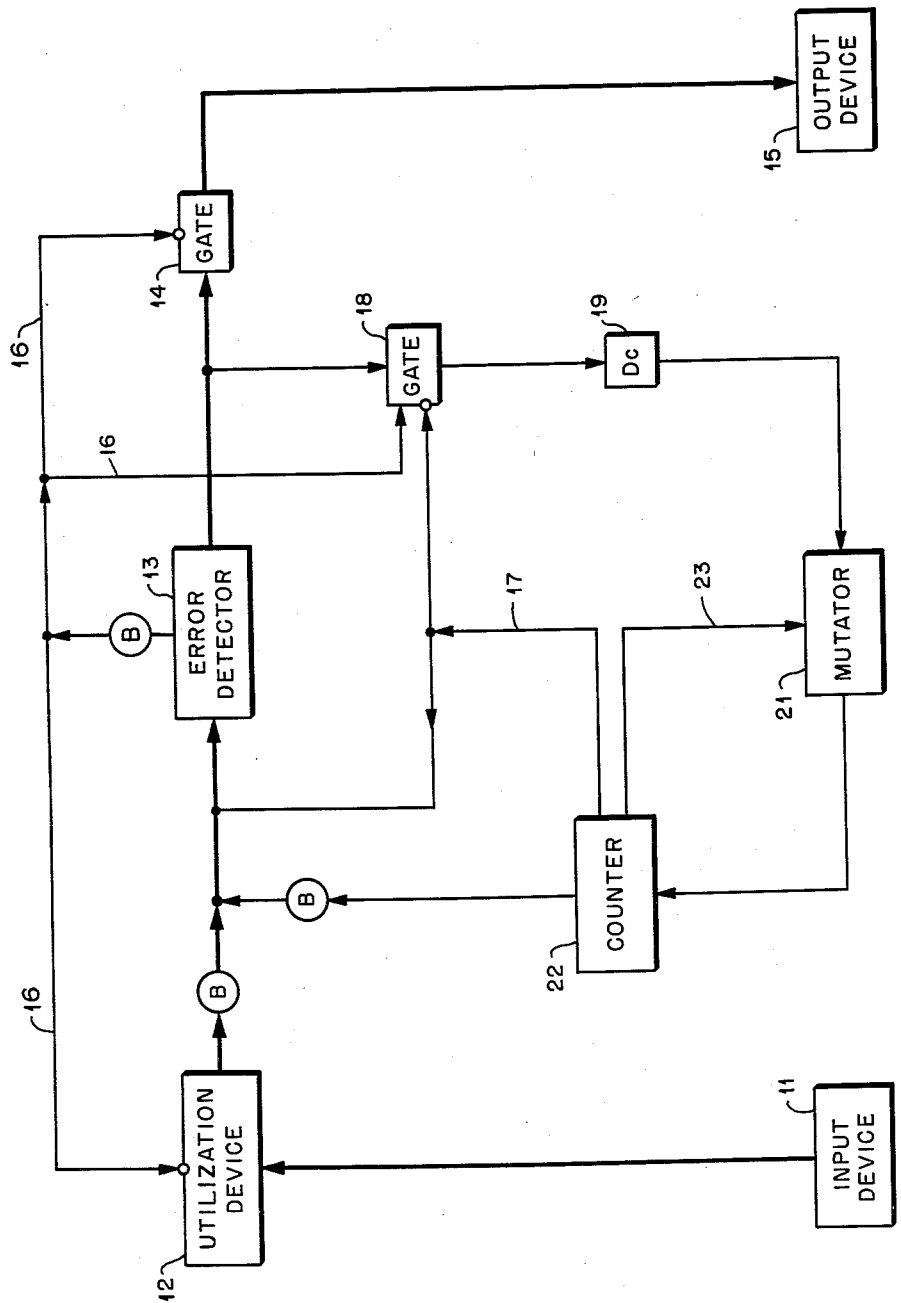
Fig. 1 is a block diagram illustrating one form of information handling system incorporating the signal responsive apparatus of this invention.

Referring now to the drawings and more particularly to Fig. 1, the reference numeral 11 designates an input device for supplying information in the proper form to an information handling system. The input device 11 is connected to a utilization device 12 which utilizes the information supplied to it by the input device 11, altering the representations of the information in accordance with instructions either built into the device or supplied to it from an external means (not shown).

The output of the utilization device 12 is connected to the input of an error detector 13 which determines the existence of an impossible information signal. For example, one popular universal automatic computer utilizes information in the form of electrical impulse trains in which each digit, numeric or alphabetic, comprises seven impulse positions, and the presence and absence of pulses in individual impulse positions is determined by the information represented by the train. The impulse code is so arranged that the total number of pulses for each digit is always odd. An error detector for determining whether the total number of pulses forming a digit is even or odd can uncover an impossible situation in information signals. If a noise pulse is added or a necessary information pulse is deleted or is rendered too weak by the malfunctioning of the equipment, the situation becomes an impossible one and the error detector reacts. An impulse code and an odd-even checker therefor are described in more detail in the patent application Ser. No. 279,710, filed on March 31, 1952, in the names of J. P. Eckert, Jr., H. F. Welsh, J. R. Weiner and R. F. Shaw and entitled Information Handling System. For purposes of this description, the error detector 13 and the information signals will be considered as being of the types described in the above-mentioned patent application.

In the normal course of events, no error will be detected by the detector 13, and the electrical impulses representing the information output of the utilization device 12 will pass through the detector 13 without causing any change in the operation of the system, passing through an inhibitory gate 14 to an output device 15. This normal flow of information signals from the input device 11 to the output device 15 is indicated in Fig. 1 by a heavy line.

A second or alternate path for the information signals is provided to be used in case of an error indication. The error detector 13, upon the detection of an impossible arrangement of electrical pulses, energizes a line 16. The line 16 is connected to an inhibitory input of the gate 14, to an inhibitory input of the utilization device 12, and to a permissive input of a gate 18 in the alternate path. The information output of the error detector 13 is also connected to the input of the gate 18, and the output of the gate 18 is connected to the input of a mutator 21 through a compensating delay 19. The compensating delay 19 is merely to ensure the proper timing of the signals in the alternate path and may be unnecessary in many systems. The mutator 21 is provided in the alternate path as a means for varying a dimension, such as the amplitude, of the signals passing therethrough. The changed signals are transmitted from the mutator 21 to a counter 22 which counts the number of times a particular signal passes therethrough. The counter 22 may be any pulse counter which produces electrical signals representative of the count, such as those counters described in "High Speed Computing Devices," by Engineering Research Associates, published by McGraw-Hill, New York, in 1950, pp. 17–25. The information output of the counter 22 is buffed into the normal information path at the input of the error detector 13 so that the changed signals passing through the counter 22 are again presented to the error detector 13 for re-inspection.

A second voltage representative of a predetermined count is buffed from the counter 22, through a line 17, to an inhibitory input of the gate 18 and, through the line 16, to the inhibitory inputs of the gate 14 and of the utilization device 12. A third voltage representative of individual counts is coupled from the counter 22 through a line 23 to a control input of the mutator 21 so as to change the manner in which the signal is modified during its circulation. After a predetermined number of counts, the second voltage is created on the line 17 to stop the operation of the entire system.

In the operation of the system of Fig. 1, information is applied to the system by the input device 11 which may be any suitable input device such as the tape transducer described in the patent application Ser. No. 176,-722, filed in the names of J. P. Eckert, Jr., H. F. Welsh, L. R. Mock, and E. D. Schreiner on July 29, 1950, and entitled Tape Drive and Recording Apparatus; punched card sensing devices; or any other means suitable to convert information into electrical impulse form capable of being handled by the system. The impulse trains which represent the information to be utilized in the system are then applied to the utilization device 12 which may be a computer for deriving mathematical results, an automatic file for arranging the supplied information in a particular sequence, a bookkeeping system for tabulating, or any other such automatic information handling system. The particular function of the entire system is immaterial to this invention.

It is presumed, in the arrangement of Fig. 1, that the information signals from the input device 11 have been checked for accuracy by an appropriate means. The utilization device 12 operates upon the information signals applied to it and changes them in some manner. A second means for detecting errors must therefore be provided in the system. This checking device is the error detector 13 through which the modified signals must pass. If the detector 13 responds to an apparent error in the train of impulses emanating from the utilization device 12, an electrical signal is developed on the line 16 and is applied to the gate 14 to prevent further passage of signals therethrough, to the utilization device 12 to terminate further action thereof, and to the gate 18 to open the gate and divert the output signals from the detector 13 through the alternate path and the mutator 21.

Figure 4:
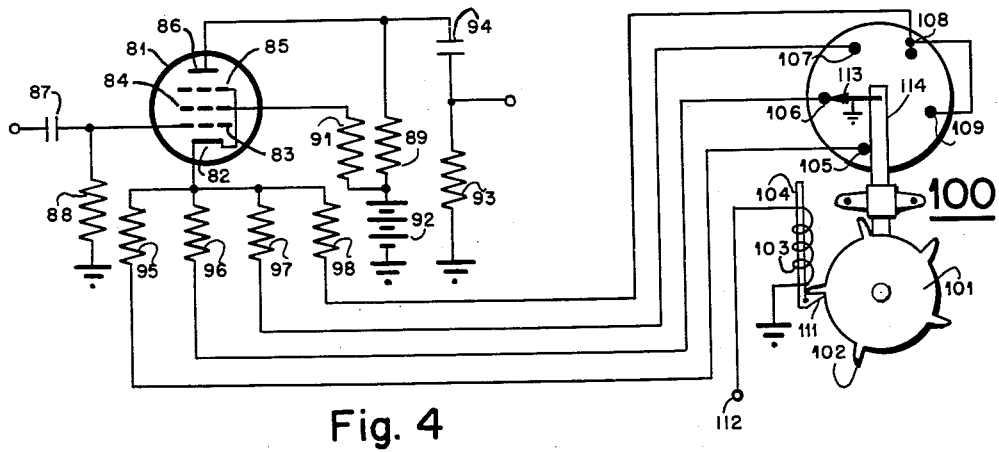
Fig. 4 is a schematic diagram of one form of the mutator of Figs. 1 through 3.

Passage of the information signals through the mutator 21 produces a change in the signals and in the manner in which the signals are again presented to the error detector 13. The type of change inflicted by the mutator 21 depends upon the routine set up therein. The mutator 21 may consist of an amplifier such as is illustrated in Fig. 4, the gain of which is varied with each excursion of the signal through the counter 22 which would control the gain of the amplifier of this example. As the signal is changed, some phenomena, such as the transient noise pulses and subthreshold pulses which were identified as errors, are eliminated and the second or the third or subsequent excursion of the information through the error detector 13 may occur without the detection of an error. Thus, stalling of the entire system may be avoided in the cases of erroneously detected errors. If, however, a preselected number of excursions through the detector 13 fails to yield an error-free pass, an electrical signal is produced on the line 17 by the counter 22 and operation of the system is halted.

Figure 2:
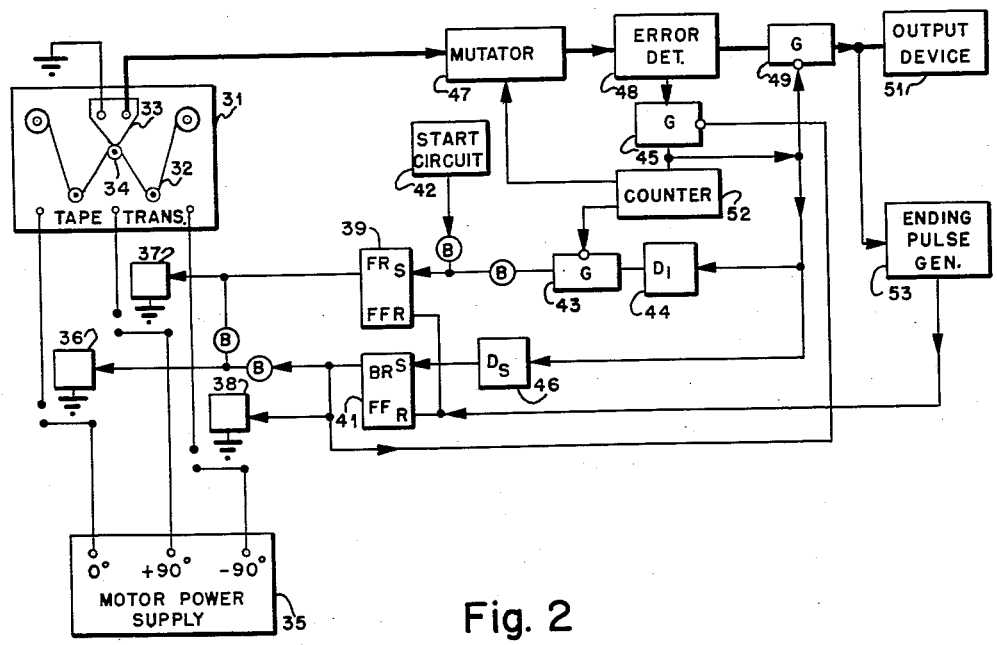
Fig. 2 is a block diagram illustrating a second form of information handling system utilizing magnetic storage and incorporating the signal responsive apparatus of this invention.

Illustrated in Fig. 2 is an embodiment of this invention utilized in a contemporary computing system. The reference numeral 31 designates a magnetic tape transducer which converts information in the form of magnetic variations on a magnetic tape 32 into electrical impulse signals capable of employment in the computing system. The tape 32 is propelled past a reading head 33 by a motor-driven capstan 34. The motor (not shown) driving the capstan 34 is powered from a motor power supply 35 which produces alternating currents in 0° phase, +90° phase and —90° phase. The motor used for the device of this description is a two phase induction motor, and the direction of its rotation, and therefore the direction of rotation of the capstan 34 and the direction of travel of the tape 32, is controlled by which one of the +90° phase current or the —90° phase current is connected into the quadrature winding of the motor.

The connections of the various currents of the power supply 35 are controlled, in turn, by normally open relays 36, 37, and 38 which are in their normally open condition when deenergized (as shown). Energization of the relays 36, 37, and 38 depends upon the state of two flip-flops (FF) forward-read flip-flop (FRFF) 39 and backward-read flip-flop (BRFF) 41. The set input of the FRFF 39 is connected to the output of a start circuit 42, which is illustrated in more detail in Fig. 6, and through a gate 43 to the output of a long delay 44. The input of the delay 44 is connected through a gate 45 to the error detector 48. The set input of the BRFF 41 is connected through a short delay 46 to the error output of the detector 48.

Connected to the output of the reading head 33 is the input of the mutator 47 which may be the amplifier illustrated in Fig. 4. The output of the mutator 47 is fed into the input of the error detector 48 where the information signals are inspected for errors. From the error detector 48, the information signals are transmitted to an output device 51 through a gate 49. An ending pulse generator 53, which may be a resettable delay flop or resettable one-shot multivibrator such as described in the copending patent application, Serial No. 229,803, filed on June 4, 1951, by B. M. Gordon and Herman Lukoff, and comprises a circuit having one stable state and one unstable state, has its input connected to the output of the gate 49. An input pulse causes the ending pulse generator circuit to change to its unstable state in which it remains for a period of time determined by the circuit characteristics. A pulse applied to the input of the delay flop before its return to the stable state, resets the circuit to keep it in its unstable state for its characteristic period of time. Therefore, although the ending pulse generator 53 normally tends to generate an output or ending pulse a predetermined time after it has been triggered, subsequent pulses applied to its input before the generation of the ending pulse will delay that generation until a predetermined period of time after the last pulse has decayed. The output of the ending pulse generator 53 is connected to the restore inputs of the FRFF 39 and BRFF 41 to restore them and allow the relays 36, 37, and 38 to open.

The set output of the BRFF 41 is applied to an inhibition input of the gate 45 through which the error output of the detector 48 is applied to the input of a counter 52. The counter 52 has two outputs, one of which represents individual counts and is connected to the control input of the mutator 47, and the other of which represents a single preselected count and is connected to an inhibition input of the gate 43.

In the normal operation of the system of Fig. 2, the tape transducer motor is started by generating a pulse in the start circuit 42. The output of the start circuit 42 sets the FRFF 39 which energizes relays 36 and 37 to power the motor in the forward direction. The capstan 34 drives the tape 32 forward past the head 33 where it is read, and the magnetic variations in the tape 32 are converted to equivalent electrical signals for transmission through the mutator 47 and the error detector 48 to the output device 51, following the path shown as a heavy line.

The error detector 48 proclaims an error in an information signal by producing a voltage at its error output and applying the voltage through the gate 45 to the counter 52, the gate 49, and the long and short delays 44 and 46. Application of the error voltage to the gate 49 closes that gate and prevents further flow of information signals to the output device 51 and to the ending pulse generator 53. The generator 53 then produces an output pulse which is applied to the restore inputs of the FRFF 39 and the BRFF 41, allowing the relays to open and the movement of the tape 32 past the head 33 to stop. At the same time that the output of the detector 48 closes the gate 49, the error output is also applied to the short delay 46. The amount of delay added to the circuit by the short delay 46 is slightly greater than the maximum time required for the tape 32 to come to rest after the gate 49 is closed. After the pulse from the error output has passed through the short delay 46, it reaches the set input of the BRFF 41 to energize the relays 36 and 38, causing the tape 32 to move past the head 33 in the backward direction. The gate 45 is closed by the same voltage that energizes the relays 36 and 38, so that an output of the error detector 48 does not affect the system during the backward movement of the tape 32. At the end of the reading of the block of information recorded on tape 32, another ending pulse is generated by the generator 53 and the tape 32 comes to rest.

When the error output is applied to the gate 49 and to the short delay 46, it is also applied to the long delay 44. The delay inserted into the circuit by the long delay 44 should be slightly greater than the maximum time required for the tape 32 to be rewound and come to rest after the gate 49 is closed. At the end of this delay, the signal applied at the input to the delay 44 reaches the set input of the FRFF 39, energizing the relays 36 and 37 and causing the tape 32 to again move past the head 33 in the forward direction.

The error signal is applied to the counter 52 and a voltage appears on the output thereof which is representative of individual counts, serving to change the operation of the mutator 47. When the tape 32 is again read, the information signals read therefrom are treated differently by the mutator 47, and what had at first caused the detector 48 to indicate the presence of an error, may this time pass without notice. If, however, the signals do not pass the second time without the indication of an error, the process is repeated until either a perfect pass is achieved, or the preselected count is reached. When the preselected count is reached, a voltage is applied from the output of the counter 52 which is representative of that count to the inhibitory input of the gate 43, preventing the passage of the delayed pulse from the long delay 44 to the FRFF 39, and, since the ending pulse generated at the end of the backward read caused the movement of the tape 32 to cease, the system remains at rest.

Figure 3:
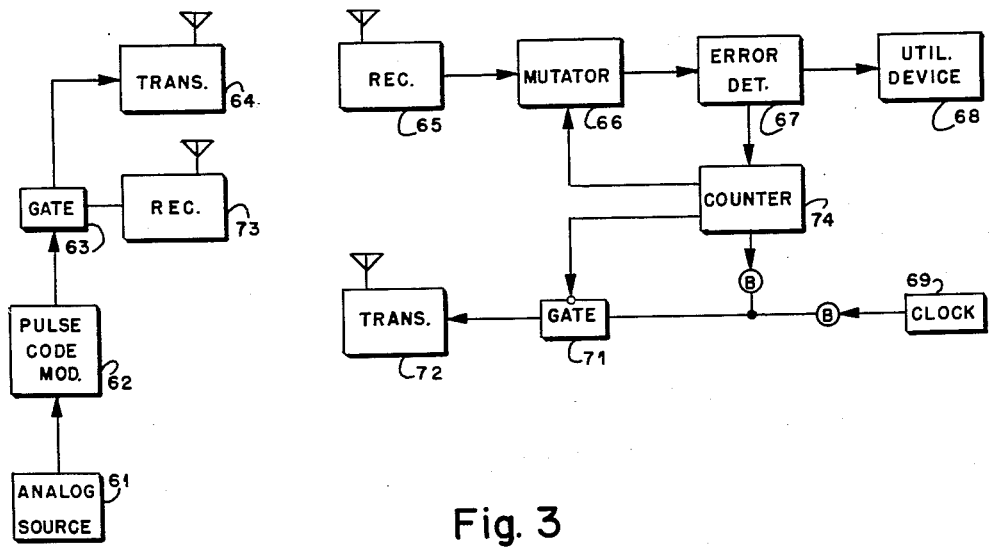
Fig. 3 is a block diagram illustrating a third form of information handling system incorporating the signal responsive apparatus of this invention.

Fig. 3 illustrates the error responsive apparatus of this invention as it applies to a telemetering or a Teletype system. A source of analog signals 61, which may be a thermocouple or other such device generating a steady-state or slowly varying signal indicative of its instantaneous condition, is connected to a pulse code modulator 62 which converts the analog output of the source 61 into an impulse code. The impulse coded output of the modulator 62 is connected through a gate 63 to a wireless or radio transmitter 64 for transmission through space. The impulses transmitted by the transmitter 64 are picked-up by a receiver 65 which forwards them through a mutator 66 and an error detector 67 to a utilization device 68. The mutator 66, the detector 67, and the utilization device 68 may be of any suitable types such as the mutators 21 and 47, the detectors 13 and 48, and the utilization device 12 of Figs. 1 and 2 described above.

The gate 63 is normally closed and requires a permissive signal in addition to the output of the modulator 62. This permissive signal is supplied by a clock 69 which is located adjacent the utilization device 68. Since the location of the source 61 is often at some distance from the location of the utilization device 68, the pulse output of the clock 69 is applied through a gate 71 to the input of a transmitter 72. The transmitter 72 is of the same type as the transmitter 64, and its output is picked-up by a receiver 73 for application to the gate 63, opening the gate 63 to the impulses from modulator 62.

The error output of the error detector 67 is connected to a counter 74 which has two outputs, one of which is representative of individual counts and is connected to the control input of the mutator 66 and the other of which is representative of a single preselected count and is connected to an inhibition input of the gate 71.

The system described is one form of telemetering system and other sources may be connected to the transmitter 64 through other modulators on a time sharing basis. The clock 69 is used to sample the signal that it supplied to the gate 63 so that the signal need not be constantly broadcast. In the normal operation of the system, the received signal will pass through the mutator 66 and the detector 67 without modifying the operation of the system. If, however, the detector 67 is affected by an ostensible error, then a voltage is generated at its error output and is applied through the counter 74 to the input of the gate 71. The counter 74, upon passage of the error signal through it, produces an individual count output voltage which is applied to the mutator 66 to change its operating characteristic and, at the same time, the error signal passes through the gate 71 to the transmitter 72 which broadcasts it. The error signal, which comes in time between two clock pulses, acts upon the gate 63 as a clock pulse, and the gate 63 opens to allow an interim sampling of the modulator output.

The output of the modulator 62 is again transmitted by the transmitter 64 and is received by the receiver 65. However, since the operating characteristics of the mutator 66 have been changed, this passage of the signals therethrough is not the same as the prior passage. The modified information signals are then presented to the detector 67 which inspects them for errors. If no errors are now found, the system continues in its normal operation, but if repeated inspections of the modified signals by the detector 67 do not produce a perfect pass, a voltage is produced at the appropriate output of the counter 74 and is applied to the inhibition input of the gate 71 to prevent further transmission of clock pulses and stop the operation of the entire system when the number of times an error signal is produced reaches the preselected number.

The source 61 has been depicted in this description as a source of analog signal which is connected to a pulse code modulator 62. In effect, the two elements may comprise a single device and generate an impulse signal directly, such as is done by a Teletype transmitter. Also, the transmission of the signals from the source to the utilization device need not be by radio but may take place over wires as do the transmission of signals in the systems of Figs. 1 and 2. By the same token, the transmission of the information signals in Figs. 1 and 2 may be by radio.

As has been mentioned, the type of mutator used in a particular system depends upon the characteristics of that system and of the form the information therein assumes. The systems described herein utilize information in the form of coded electrical impulses for which one possible form of mutator is illustrated in Fig. 4. A pentode 81 comprises a cathode 82, a control grid 83, a screen grid 84, a suppressor grid 85 and an anode 86. A signal is applied to the control grid 83 through a coupling capacitor 87 and a grid return resistor 88. Energy is supplied by a source of direct current 92 to the anode 86 through an anode load resistor 89 and to the screen grid 84 through a current limiting resistor 91. The output is taken from the anode 86 through a capacitor 94 and across a resistor 93.

The direct current and signal path from the anode 86 to the cathode 82 is completed through an external circuit comprising a switch 100 having a plurality of stationary contacts 105, 106, 107, 108 and 109 and a rotatably movable contact 113. The movable contact 113 is mounted upon one end of a shaft 114, the other end of which is connected to a rotatably mounted disc 101. About the periphery of the disc 101 are fastened a plurality of ratchet teeth 102, one tooth being provided for each of the stationary contacts 105–109. A pawl 111, mounted on one end of an axially movable core 104 of a solenoid 103, engages the ratchets 102 individually to rotate the disc 101 when an actuating signal is applied to the solenoid 103 through an input terminal 112. The movable contact 113 which is arranged to sweep the stationary contacts sequentially is connected to ground, and each of the stationary contacts 105, 106, 107 and 108 is connected to one end of its respective resistor 95, 96, 97 and 98, the other ends of which are connected together and to the cathode 82. The stationary contact 109 is connected to the contact 108, providing two identical switching positions.

The purpose of a mutator is to provide a circuit element which changes the impedance or other characteristic of the information signal circuit in response to electrical pulses from the appropriate sources such as the counters 22, 52, or 74. The circuit of Fig. 4 is that of a mutator which comprises an amplifier stage, the gain and operating conditions of which are varied periodically in response to pulses. A pulse applied to the input terminal 112 of the solenoid 103 causes the core 104 to be moved upwardly as shown. The pawl 111 engages the particular ratchet tooth 102 which is adjacent thereto at the time and pulls the disc 101 around through a portion of a revolution. The disc 101, the shaft 114 and the movable contact 113, being connected together, rotate together; and the contact 113 moves from one stationary contact to the next, removing one cathode resistor from and inserting another into the anode-cathode circuit of the tube 81. The variation in the series resistance of the circuit varies the gain and the operating point of the stage and changes the operating characteristics of the entire circuit of which it is a part. Two identical positions are provided by connecting two of the stationary contacts, in this case 108 and 109, together so that if the response of the error detector is due solely to a transient condition which quickly disappears, the information signal may be again sent through the mutator without being changed. If the second passage through the system without change does not result in an error-free pass, then the mutator commences to sequentially switch the different cathode resistors 95–98 into the circuit of the cathode 82—anode 86 in an effort to determine the actual and not merely the apparent existence of an error.

Figure 5:
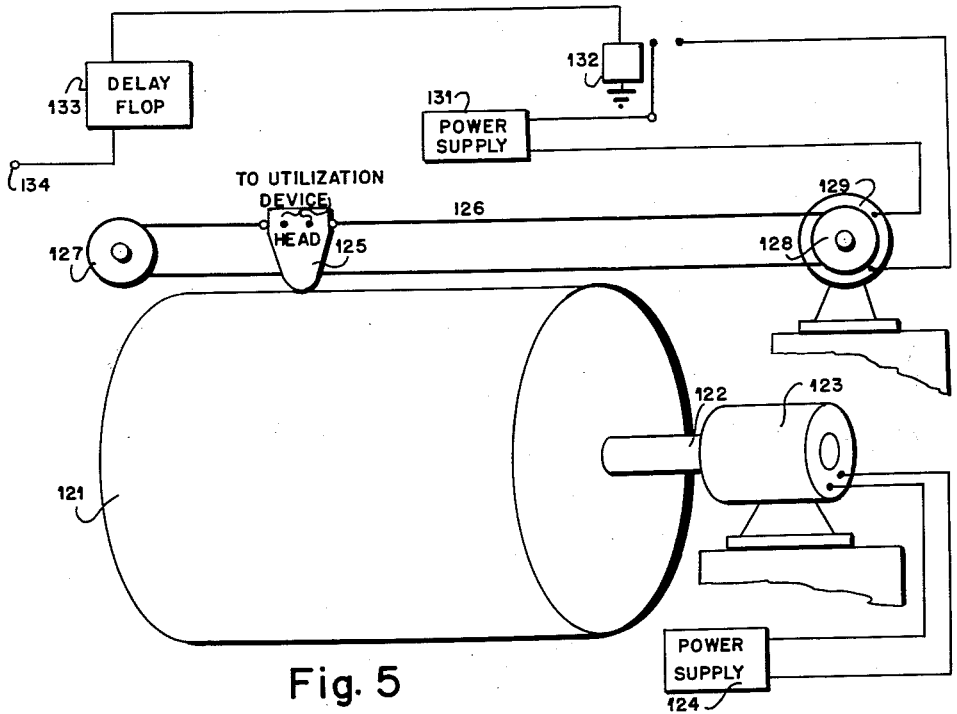
Fig. 5 is an illustration, partly in block form and partly diagrammatic, of another form of the input device of Fig. 2.

Another form of magnetic input device alternate to that illustrated in Fig. 2 is shown in diagrammatic form in Fig. 5. A drum 121 having a surface of paramagnetic material is rotatably mounted on a shaft 122 and is rotated by a motor 123 to which energy is supplied by a power supply 124 of any suitable type. A reading head 125 is movably supported adjacent the drum 121 by a cable 126 which is fastened to the head 125 and passes over an idler pulley 127 and a driving pulley 128 to which a motor 129 is connected. Energy is supplied to the motor 129 by a suitable power supply 131 through the contacts of a normally closed relay 132. The relay 132 is energized to the open position by a delay flop 133 which is set by a pulse applied to an input terminal 134.

The magnetic surface of the drum 121 has magnetic signals recorded thereon in separate tracks about the circumference thereof. Rotation of the drum 121 by the motor 123 causes relative motion between the recorded magnetic signals and the reading head 125 and induces equivalent electric signals in the head. If the magnetic signals are recorded in a series of discrete tracks, the reading head 125 is moved by the motor 129 parallel to the longitudinal axis of the drum 121 in steps, passing from one track to another and stopping at a track for a sufficient length of time to read whatever information is desired from that track.

The motion of the head 125 may be interrupted by energization of the relay 132 while maintaining the rotation of the drum 121. When the relay 132 is energized and its contacts open, the head 125 remains stationary and continues to read information from the same track on the drum 121 until either the head is moved or the drum ceases to rotate. Thus, it can be seen, that upon the discovery of an error in the information signals being read from the drum 121, all that is necessary to re-read that information is to interrupt the motion of the head 125. No rewinding or backward motion of the head is necessary.

The interruption of the motion of the head 125 is accomplished by the application of an error signal from an error detector such as 13, 48 or 67 of Figs. 1, 2 and 3 to the input terminal 134. This signal sets the delay flop 133 which energizes the relay 132 to open the head-driving circuit, and the delay flop 133 remains set for a period of time sufficient to completely read a track. In this manner, the information containing an ostensible error may be reread repeatedly with the use of only a small amount of equipment.

Figure 6:
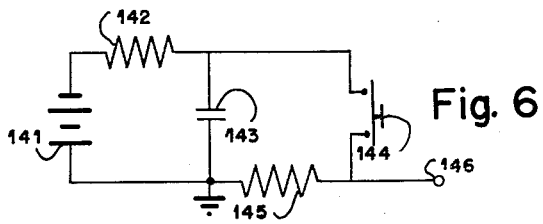
Fig. 6 is a schematic drawing of one form of a start circuit of Fig. 2.

The start circuit 42 of Fig. 2 may be any suitable device for generating a single pulse upon demand. One such circuit is illustrated in Fig. 6. A source of direct current 141 is connected in series with a resistor 142 and a capacitor 143, the source 141 tending to charge the capacitor 143 through the resistor 142. A parallel branch is connected across the capacitor 143 and comprises a normally open push-button switch 144 in series with a resistor 145, the resistance of which is much less than the resistance of resistor 142. An output terminal 146 is connected across the resistor 145.

Upon closure of the switch 144, the capacitor 143 discharges rapidly through the resistor 145, generating a voltage pulse across the resistor 145. This voltage pulse is applied through the terminal 146 to the appropriate circuit.

The invention described above comprises apparatus for automatically rereading or recirculating information signals which contain ostensible errors, at the same time selectively changing the characteristics of the circuit through which these signals pass in order to ensure that errors so indicated are true errors and not of a transient or threshold nature. For the purposes of these descriptions, the apparatus described above comprise equipment which generate or respond to electrical impulses. However, the principles of this invention are applicable to equipment of all types and need not necessarily be either electrical or impulse responsive. The particular examples presented hereinabove are intended as illustrative only and are not intended to be construed as limiting in any sense. Other modifications and applications of the invention described herein will be obvious to those skilled in the art without the exercise of invention, and it is intended that this invention be limited only by the scope of the appended claims.

What is claimed is:

1. In an information handling system in which information is represented by information signals, means for receiving information signals, means for the manipulation and utilization of information signals received by said receiving means, coupling means including signal modifying means for connecting said receiving means with said manipulation and utilization means, an error detector connected to said coupling means for detecting errors in information signals applied to said coupling means, said error detector being responsive to an error in said information signals to generate an error signal, said signal modifying means being responsive to an error signal for modifying the characteristics of signals passing through said coupling means, means responsive to an error signal for causing the reapplication of information signals having a detected error to said coupling means, and means responsive to an error signal for resubmitting said modified information signals to said error detector for the redetection of errors therein.

2. A system for handling signals representative of information comprising an information signal modifying means, a device for manipulating and utilizing said signals, an input device for supplying said signals to said manipulation and utilization device, a coupling means for transmitting said signals representative of information from said input device to said manipulation and utilization device, said coupling means comprising an error detector for generating an error signal in response to an error in said signals representative of information, means responsive to an error signal for diverting said signals representative of information which caused the generation of said error signal from said manipulation and utilization device to said information signal modifying means and resubmitting said information signals to said error detector via said information signal modifying means wherein said last named means is responsive to an error signal for modifying the amplitude of said diverted information signals before resubmission thereof to said error detector whereby signals representative of information are automatically re-examined for errors to eliminate the effects thereof.

3. The system defined in claim 2 wherein said information signals resubmitted to the error detector are the signals first submitted and recirculated.

4. The system defined in claim 2 wherein said information signals resubmitted to said error detector are signals which are separately supplied by said input device subsequent to the detection of an error but which represent the information represented by the originally submitted signals.

5. The system defined in claim 4 wherein said input device comprises a magnetic storage device and a reading head therefor, said input device responding to an error signal by re-reading the information identified by the error detector as containing an error.

6. The system defined in claim 5 wherein said magnetic device comprises a magnetic tape and drive means therefor; said magnetic device responding to an error signal by stopping the motion of said tape, rewinding said tape and causing said tape to again move past said head in its original drection.

7. The system defined in claim 5 wherein said magnetic device comprises a magnetic drum and driving means therefor, and wherein head comprises a reading head and driving means therefor, said input device responding to an error signal by stopping any motion of the head.

8. The system defined in claim 4 wherein said input device comprises an information signal generator and sampling means therefor, said input device responding to an error signal by causing repeated operation of said sampling means.

9. A system for handling signals representative of information comprising, means for receiving said signals, means for the manipulation and utilization of said signals received by said receiving means, coupling means for connecting said receiving means to said utilization and manipulation means, an error detector for detecting errors in said signals applied to said coupling means and responsive to an error therein to generate an error signal, recirculation means responsive to an error signal for causing the re-application of said signals representative of said information containing an error to said coupling means, said recirculation means comprising apparatus for varying the amplitude of said information signals containing an error, and for resubmitting said modified information signals to said error detector for the redetection of errors therein.

10. The information handling system defined in claim 9 wherein said information signals re-applied to said coupling means are the signals representative of information first applied and recirculated.

11. The information handling system defined in claim 9 wherein said information signals re-applied to said coupling means are signals which are separately supplied by said receiving means subsequent to an error detection but which represent the identical information represented by the originally applied signals.

12. The information handling system defined in claim 11 wherein said receiving means comprises a magnetic storage device and a reading head therefor, said receiving means responding to an error signal by re-reading the information identified by the error detector as containing an error.

13. The information handling system defined in claim 12 wherein said magnetic device comprises a magnetic tape and drive means therefor; said magnetic device responding to an error signal by stopping the motion of said tape, rewinding said tape, and causing said tape to again move past said head in its original direction.

14. The information handling system defined in claim 12 wherein said magnetic device comprises a magnetic drum and driving means therefor, and wherein said head comprises a reading head and driving means therefor, said receiving means responding to an error signal by stopping any motion of said head.

15. The information handling system defined in claim 11 wherein said receiving means comprising an information signal generator and sampling means therefor, said receiving means responding to an error signal by causing repeated operation of said sampling means.

16. A system for handling signals representative of information comprising an error detecting apparatus having an input terminal adapted to receive said signals, said error detecting apparatus producing a first output signal upon the detection of an error in said signals representative of information, an information signal modifying means connected to receive said signals representative of information for varying the amplitude of said signals upon the generation of said first output signal from said error detecting device, and means responsive to said information signal modifying means interposed between said information modifying means and said input terminal of said error detecting apparatus for causing signals altered by said information signal modifying means to be resubmitted to said error detecting apparatus.

17. A system for handling signals representative of information comprising an error detecting apparatus having an input terminal adapted to receive said signals, said error detecting apparatus producing a first output signal upon the detection of an error in the signals representative of information, an information signal modifying means connected to receive said signals representative of information via said error detecting apparatus for varying the amplitude of said signals upon the generation of said first output signal from said error detecting device, said information signal modifying means acting upon said signals representative of data to vary the amplitude thereof in a sequence of different steps, and means responsive to said information signal modifying means interposed between said information signal modifying means and said input terminal of said error detecting apparatus for causing signals modified by said signal modifying means to be resubmitted to said error detecting apparatus.

18. A system for handling signals representative of information comprising an error detecting apparatus having an input terminal adapted to receive said signals, said error detecting apparatus producing a first output signal upon the detection of an error in said signals representative of information, an information signal modifying means for varying the amplitude of said signals representative of information and sequence of steps upon the generation of said first output signal from said error detecting device, a selectively operable transmission link connected to receive said first output signal and said signals representative of information, said link further being connected to the input of said information signal modifying means for transmitting said signals representative of information to said modifying means upon the reception of an error signal, and control means responsive to said information signal modifying means interposed between said last named means and said input terminal of said error detecting apparatus for causing signals modified by said information signal modifying means to be resubmitted to said error detecting apparatus.

19. The system defined in claim 18 wherein said control means includes a counter connected to said link and said information signal modifying means for selectively inhibiting said link when said counter reaches a predetermined count and for sequencing said information modifying means as the counter changes its count.

20. The system defined in claim 18 further comprising means for utilizing said signals representative of information and a normally permissive transmission link having an input and an output adapted to receive said signals representative of information at its input and connected at its output to said utilization means, said link means further connected to receive said first output signal from said error detecting apparatus wherein said first output signal renders said link inoperative.

References Cited in the file of this patent

UNITED STATES PATENTS

| | | |
|---|---|---|
| 2,518,405 | Van Duuren | Aug. 8, 1950 |
| 2,552,629 | Hamming | May 15, 1951 |
| 2,688,656 | Wright | Sept. 7, 1954 |
| 2,706,215 | Van Duuren | Apr. 12, 1955 |
| 2,735,889 | Canfora | Feb. 21, 1956 |